United States Patent
Schenck et al.

(10) Patent No.: US 6,692,022 B2
(45) Date of Patent: Feb. 17, 2004

(54) ACTIVE VENTING OF AN AIRBAG MODULE

(75) Inventors: Michael A. Schenck, Miamisburg, OH (US); Michael J. Vendely, Kettering, OH (US); Charles D. Griever, Jr., Springfield, OH (US)

(73) Assignee: Delphi Technologies, Inc., Troy, MI (US)

( * ) Notice: Subject to any disclaimer, the term of this patent is extended or adjusted under 35 U.S.C. 154(b) by 24 days.

(21) Appl. No.: 10/192,742

(22) Filed: Jul. 10, 2002

(65) Prior Publication Data

US 2003/0025309 A1 Feb. 6, 2003

Related U.S. Application Data

(60) Provisional application No. 60/305,500, filed on Jul. 12, 2001.

(51) Int. Cl.[7] .............................................. B60R 21/30
(52) U.S. Cl. ......................... 280/739; 280/736; 280/742
(58) Field of Search .............................. 280/739, 736, 280/742, 741

(56) References Cited

U.S. PATENT DOCUMENTS

| | | | | |
|---|---|---|---|---|
| 5,100,172 A | * | 3/1992 | Van Voorhies et al. | 280/738 |
| 5,366,241 A | * | 11/1994 | Kithil | 280/735 |
| 5,368,329 A | * | 11/1994 | Hock | 280/741 |
| 5,407,226 A | * | 4/1995 | Lauritzen et al. | 280/728 R |
| 5,639,117 A | * | 6/1997 | Mandzy et al. | 280/741 |
| 5,743,558 A | | 4/1998 | Seymour | 280/739 |
| 5,788,274 A | * | 8/1998 | Gunn | 280/736 |
| 5,829,784 A | * | 11/1998 | Brown et al. | 280/737 |
| 6,036,226 A | * | 3/2000 | Brown et al. | 280/736 |
| 6,089,600 A | * | 7/2000 | Schenck et al. | 280/740 |
| 6,231,077 B1 | * | 5/2001 | Karolek et al. | 280/735 |
| 6,474,684 B1 | * | 11/2002 | Ludwig et al. | 280/741 |
| 6,513,835 B2 | * | 2/2003 | Thomas | 280/743.2 |

* cited by examiner

Primary Examiner—Christopher P. Ellis
Assistant Examiner—Rashmi K Sharma
(74) Attorney, Agent, or Firm—Scott A. McBain (57) ABSTRACT

A dynamically adjustable automotive air bag gas venting system including an inflatable cushion stored in a non-inflated configuration; an inflator receptive of a first command signal for initiating the inflator; a retainer plate; a base plate; a rotatable ring positioned between the base plate and the retainer plate and a pyrotechnic actuator receptive of a second command signal for initiating the pyrotechnic actuator so as to at least partially vent inflation gas from an air bag.

37 Claims, 8 Drawing Sheets

ACTIVE VENTING OF AN AIRBAG MODULE

CROSS REFERENCE TO RELATED APPLICATIONS

This application claims the benefit of U.S. Provisional Application Serial No. 60/305,550 filed on Jul. 12, 2001 the contents of which are incorporated herein by reference thereto.

TECHNICAL FIELD

This present disclosure relates to an apparatus and method for tuning or adjustment of air bag pressure venting prior to, during or after deployment of the air bag.

BACKGROUND OF THE INVENTION

Air bag modules have become common in modern automobiles. An air bag module typically comprises an inflatable cushion and an inflator within a housing. The module is installed in a desired position within the vehicle, such as the steering wheel, the dashboard, the seat, the A-pillar, and the like. The inflatable cushion is stored in a folded position within the housing in fluid communication with an inflator. In response to an activation event or occurrence, a sensor provides a signal for activating the inflator. The inflator provides a supply of inflating gas to the cushion to inflate the cushion, deploying it from the housing into the vehicle.

SUMMARY

This present disclosure provides for actively or dynamically adjusting the venting of inflation gas from a driver side or passenger side air bag cushion at any time prior to, during or after deployment of the air bag. This provides additional venting in advance of the deployment, additional venting during gas generation (cushion fill) or additional venting after the deployment. The additional venting is provided by holes or vent slots in a base plate and an inflator flange or a retainer plate. In the normal state (e.g., prior to activating the additional venting), the vent slots of the base plate and the inflator flange or retainer plate are blocked by a rotatable ring or rectilinearly slidable plate. When additional venting is requested, an actuator translates the rotatable ring or slidable plate to a position whereby vent slots in the rotatable ring or slidable plate at least partially align with the vent slots in the base plate and inflator flange or retainer plate. The additional vent slots are thus open for some of the inflation gas to exit the cushion.

In the case where no additional venting is requested, the rotatable ring or slidable plate is not translated, and the vent slots remain blocked and deployment of the air bag proceeds without additional venting.

As the inflation gases are in direct contact with the inflator flange to exit the additional vent slots, the invention has a cushion ring and cushion mouth larger in diameter than the inflator body. The rotatable ring or slidable plate could be made of self-lubricating plastic material to avoid corrosion or sticking of the mechanism.

Infinite adjustment of the vent slot size is achieved by means for translating the rotatable ring or slidable plate in controlled amounts. The controlled translation is accomplished with a linear actuator. Also, the controlled translation or limits on the translation can be accomplished prior to, during or after the deployment of the air bag with sensor inputs from the seat belt latch switch, seat-track position sensor, occupant weight sensor, etc. A first linear actuator can be used to adjust stops on the rotatable ring or slidable plate prior to the deployment, based upon, for example, seat belt usage, seat track position, occupant size, etc. A second actuator can initiate translation of the rotatable ring or slidable plate to the stops during or after deployment of the airbag as necessary. This provides two levels of venting during the deployment, with the second level of venting being infinitely adjustable prior to deployment.

DESCRIPTION OF THE DRAWINGS

Reference is made to the drawings wherein like elements and features are numbered alike and wherein.

DESCRIPTION OF THE PREFERRED EMBODIMENTS

Figure 7:
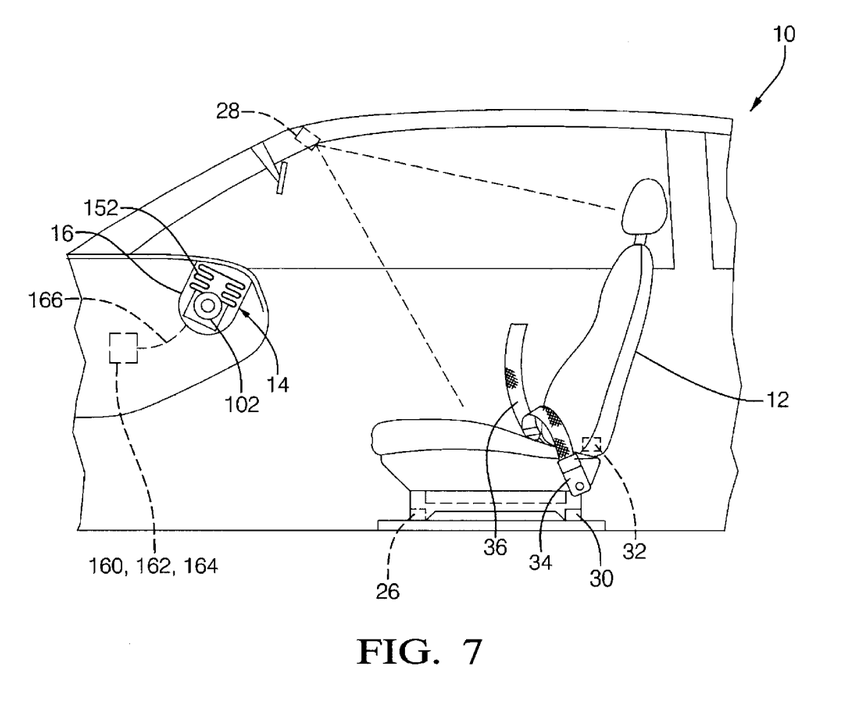
FIG. 7 is a schematic view of the passenger side a vehicle interior showing an air bag cushion in a stored or undeployed state.

Referring now to the Figures, and in particular to FIG. 7 a portion of a vehicle 10 is illustrated. Included in an interior compartment of vehicle 10 are a seating structure 12 and an air bag module 14 disposed in a spatial relationship with respect to seating structure 12. The air bag module 14 comprises a housing 16, an inflator 102, and an inflatable air bag or inflatable cushion 152. The module 14 is positioned in the vehicle 10 for deployment of the inflatable cushion 152 inboard of the vehicle (e.g., towards the seating structure 12). A sensor or sensing-and-diagnostic module 160, 162, 164 is adapted to detect an activation event to provide a command signal 166 to the inflator 102. Thus, the command signal 166 controls the activation of the airbag module 14.

The inflatable cushion 152 is stored in a folded or undeployed position in the housing 16, and is in fluid communication with the inflator 102. Upon detection of an activation event by the sensing-and-diagnostic module 160, 162, 164 the inflator 102 is activated via command signal 166 to generate an inflation gas. The inflation gas inflates and expands the inflatable cushion 152 from the housing 16 into the interior of the vehicle 10. It should be recognized that the module 14 is illustrated by way of example only as being included in the dashboard of the vehicle 10. Of course, it is contemplated that the module 14 be installed for deployment in other regions of the vehicle 10, such as, but not limited to the steering wheel, the seat, the A-pillar, the roof, and other locations.

In accordance with an exemplary embodiment or as an alternative, the sensing-and-diagnostic module 160, 162, 164 is also adapted to detect one or more loads on the seating structure 12, a position of the seating structure, an angle of a portion of the seating structure with respect to another portion, the distance the seating structure is from the air bag module 14, and other data that is related to the deployment of the airbag. For example, the sensing-and-diagnostic module 160, 162, 164 receives input from a plurality of sensors such as a seat position sensor 26, an optical scanner 28, a load sensor 30, a seat recline sensor 32, and a seat belt use detection sensor 34. All of the sensors are positioned to be able to provide input signals to module 160, 162, 164.

The seat position sensor detects the position or distance of seating structure 12 with respect to the air bag module 14 (e.g., seat position full forward, one-third forward, full rearward with respect to the module, and the like). Similarly, the optical scanner 28 is used to detect the position of seating structure 12. The load sensor is disposed within the seating structure 12 and is used detect the load on the seating structure. Thus, sensor 30 is capable of detecting the specific weight or load on a portion of seating structure 12. The seat recline sensor is used to detect the degree or angle to which an upper or back portion of the seating structure 12 is reclined or positioned with respect to a lower or seat portion of seating structure 12. The seat belt use detection sensor is used to determine whether the seat belt 36 is secured (e.g., buckled is inserted into its corresponding clasp).

Figure 8:
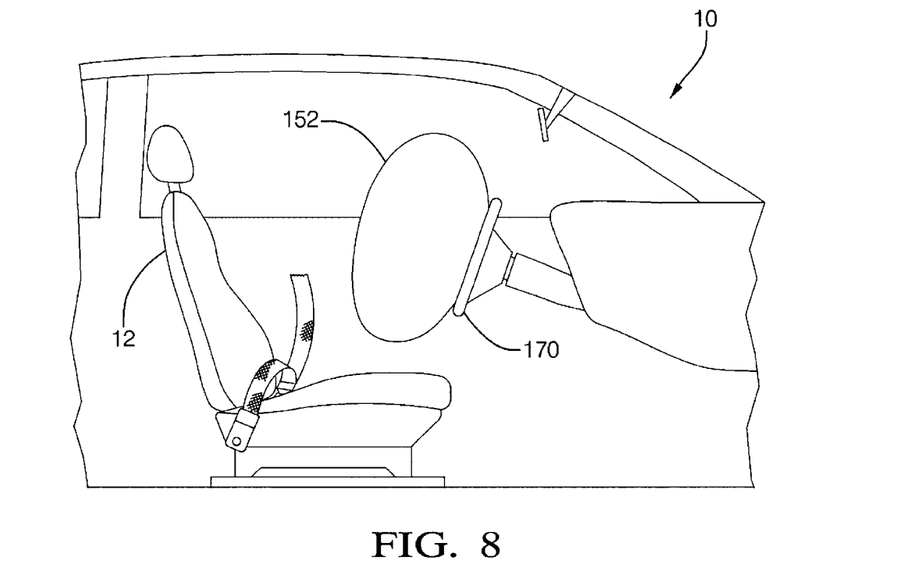
FIG. 8 is a schematic view of a vehicle interior showing a driver side air bag cushion in a deployed state.

FIG. 8 shows the inflatable cushion or air bag 152 installed in the steering wheel 170 and in a deployed state in relation to the driver side of the interior of the vehicle 10.

Figure 1:
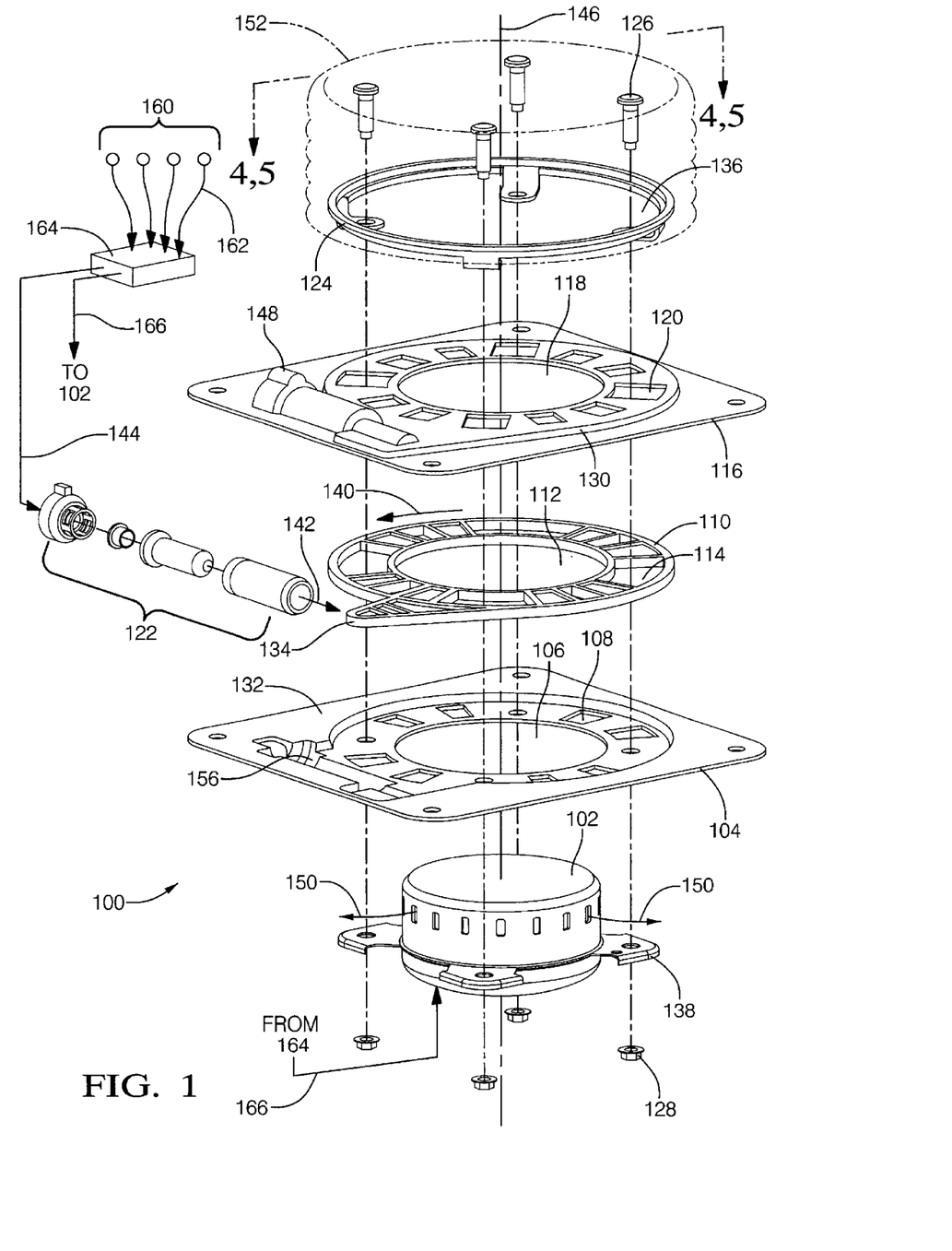
FIG. 1 is an assembly drawing of an adjustable automotive air bag gas venting device.
Figure 13:
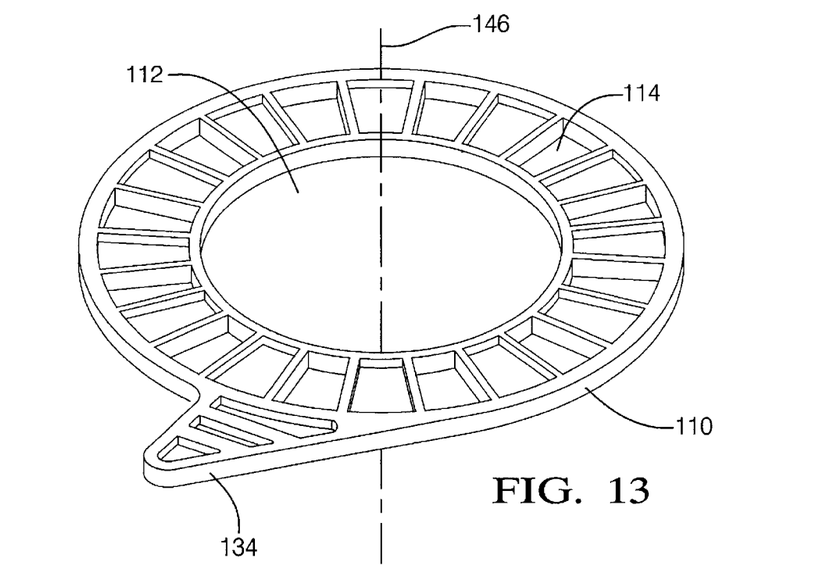
FIG. 13 is a three dimensional view of a rotatable ring of the adjustable automotive air bag gas venting device of FIG. 1.
Figure 14:
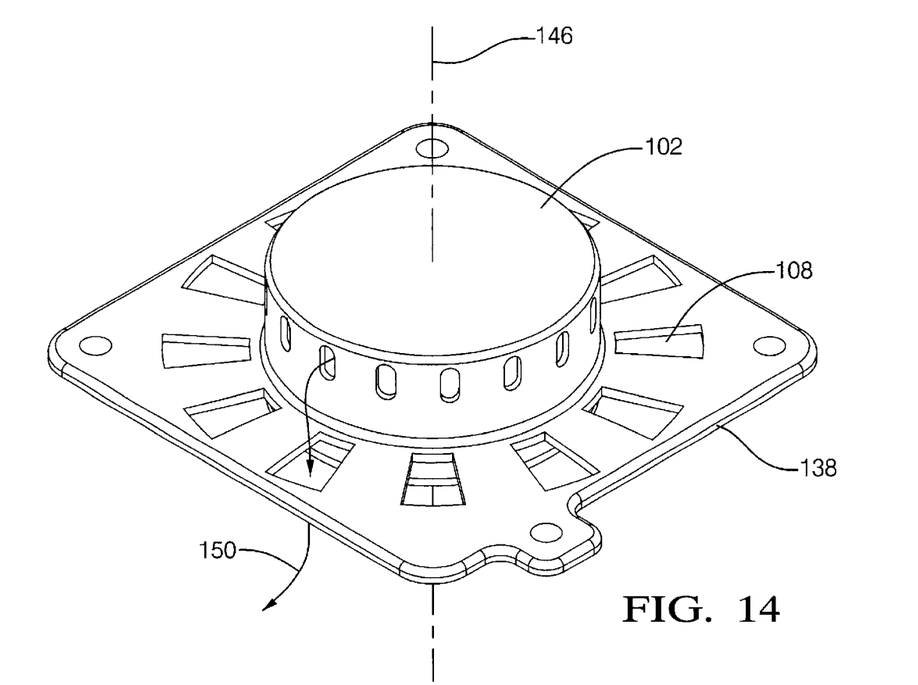
FIG. 14 is a three dimensional view of an inflator and flange of the adjustable automotive air bag gas venting device of FIG. 1.
Figure 15:
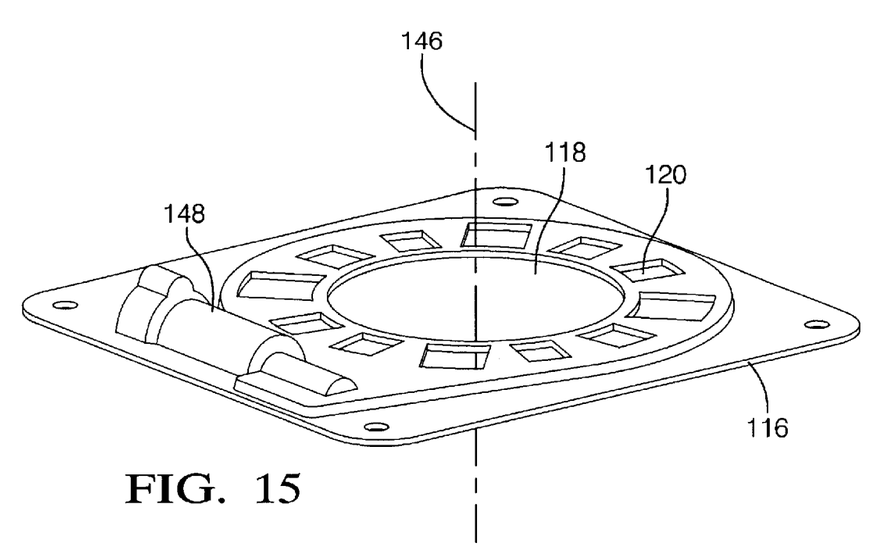
FIG. 15 is a three dimensional view of a base plate of the adjustable automotive air bag gas venting device of FIG. 1.
Figure 16:
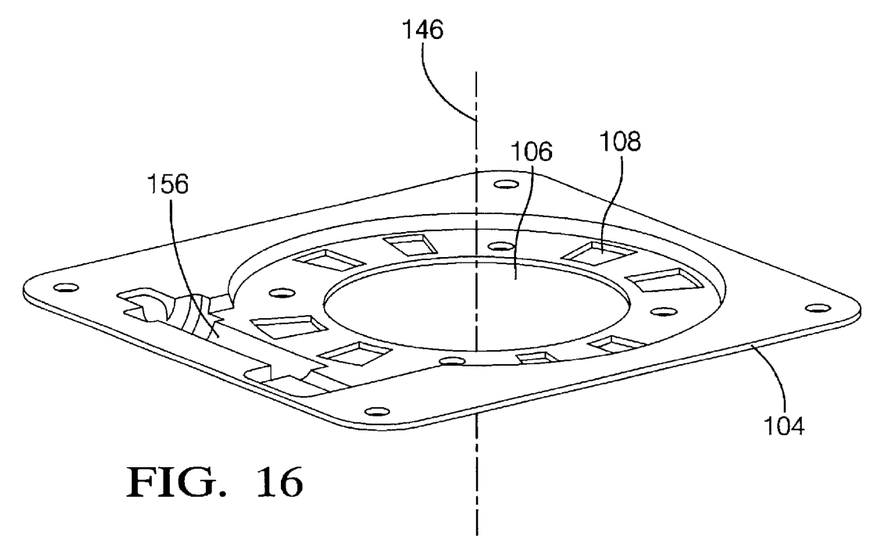
FIG. 16 is a three dimensional view of a retainer plate of the adjustable automotive air bag gas venting device of FIG. 1.

In FIG. 1 an adjustable automotive air bag gas venting device is shown generally at 100. The gas venting device 100 comprises an inflatable cushion 152 stored in a non-inflated configuration. An inflator 102 (FIG. 14), in fluid communication with the inflatable cushion 152, is operative to generate a prescribed quantity of inflation gas 150 so as to deploy the inflatable cushion 152 to an inflated configuration. A retainer plate 104 (FIG. 16) includes a first aperture 106 receptive of the inflator 102 and a first set of vent slots 108 peripheral to the first aperture 106. A base plate 116 (FIG. 15) includes a second aperture 118, aligned with the first aperture 106 and also receptive of the inflator 102. A second set of vent slots 120 in the base plate 116 are aligned with the first set of vent slots 108 and are peripheral to the second aperture 118. A rotatable ring 110 (FIG. 13), positioned between the base plate 116 and the retainer plate 104, includes a third aperture 112 aligned with the first and second apertures 106, 118. The third aperture 112 is also receptive of the inflator 102. The rotatable ring 110 includes a third set of vent slots 114 peripheral to the third aperture 112.

Continuing in FIG. 1, an actuator 122 is receptive of a command signal 144 and is positioned proximate to the rotatable ring 110 at a bracket or similar member 134 protruding from the rotatable ring 110. The actuator 122, in response to the command signal 144, is operative to exert a force 142 on the bracket 134 so as to rotate the rotatable ring 110 about a common axis 146, thereby at least partially aligning the third set of vent slots 114 with the first and second set of vent slots 108, 120 during deployment of the inflatable cushion 152 to the inflated configuration. As best understood from FIG. 1, upon the assembly of the gas venting device 100, the retainer plate 104, the actuator 122, the rotatable ring 110 and the base plate 116 are an integrated unit.

The gas venting device 100 also includes a retaining ring 124 for securing the inflatable cushion 152, the retainer plate 104, the base plate 116, the rotatable ring 110 and the actuator 122 to the inflator 102 at flanges 138, by way of fasteners 126, 128.

Figure 2:
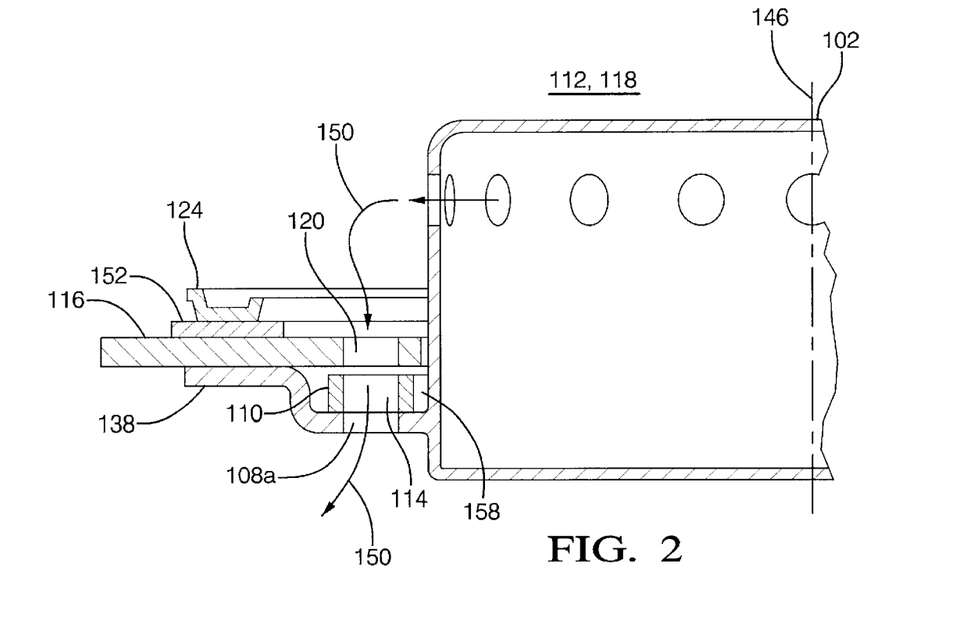
FIG. 2 is a first partial sectional view of an adjustable automotive air bag gas venting device.

In FIG. 2 a first partial sectional view of an alternative adjustable automotive air bag gas venting device is shown. The inflatable cushion 152 is stored in a non-inflated configuration. The inflator 102 is in fluid communication with the inflatable cushion 152 and operative to generate a prescribed quantity of inflation gas 150 so as to deploy the inflatable cushion 152 to an inflated configuration. The inflator 102 includes a flange 138 peripheral to the inflator 102 and an integral part thereof. The flange 138 includes a fourth set of vent slots 108a peripheral about the flange 138. The base plate 116 includes the second aperture 118 receptive of the inflator 102. The second set of vent slots 120 in the base plate 116 is aligned with the fourth set of vent slots 108a and is peripheral to the second aperture 118. The rotatable ring 110 is positioned between the base plate 116 and the flange 138. The rotatable ring 110 includes the third aperture 112 aligned with the second aperture 118 and is receptive of the inflator 102. The rotatable ring 110 includes the third set of vent slots 114 peripheral to the third aperture 112.

Continuing in FIG. 2, as in FIG. 1, an actuator (not shown) is receptive of the command signal and positioned proximate to the rotatable ring 110 and operative in response to the command signal to rotate the rotatable ring 110 so as to at least partially align the third set of vent slots 114 with the first and second set of vent slots 108, 120 during deployment of the inflatable cushion 152 to the inflated configuration.

In FIG. 2, the gas venting device also includes the retaining ring 124 for securing the inflatable cushion 152, the base plate 116, the rotatable ring 110 and the actuator 122 to the flange 138 of the inflator 102. The flange 138 of FIG. 2 is formed by way of a seat 158 so as to allow the rotatable ring 110 to fit securely between the base plate 116 and the flange 138.

Figure 3:
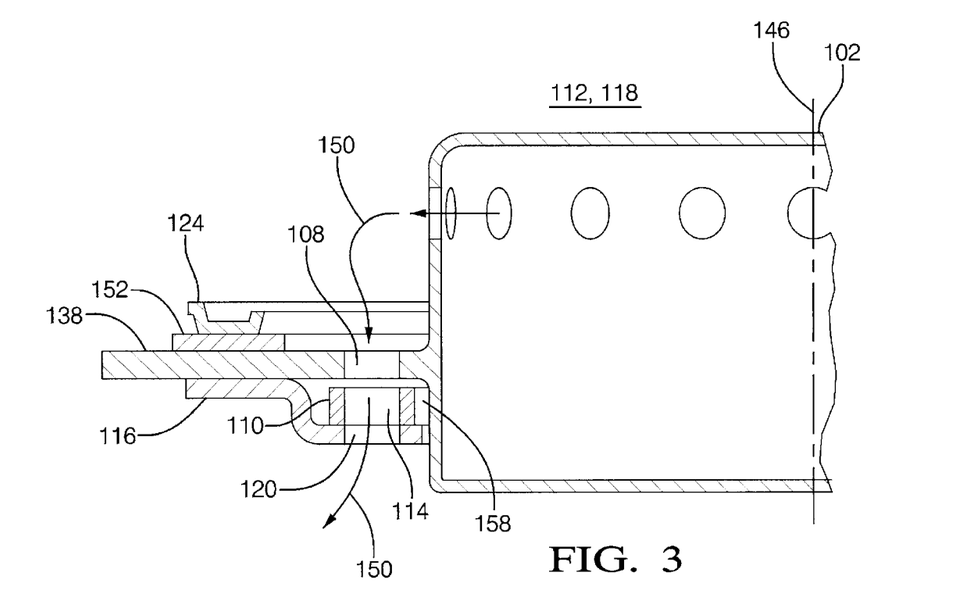
FIG. 3 is a second partial sectional view of an adjustable automotive air bag gas venting device.

As seen in FIG. 2, the relative positioning of the base plate 116, the flange 138 and the rotatable ring 110 is such that the base plate 116 is between the retaining ring 124 and the flange 138. In FIG. 3 a second partial sectional view of an alternative adjustable automotive air bag gas venting device is shown. In contrast to FIG. 2, as seen in FIG. 3, the relative positioning of the base plate 116, the flange 138 and the rotatable ring 110 is such that the flange 138 is positioned between the retaining ring 124 and the base plate 116. In FIG. 3, the base plate 116 is formed by way of a seat 158 so as to allow the rotatable ring 110 to fit securely between the base plate 116 and the flange 138.

Figure 4:
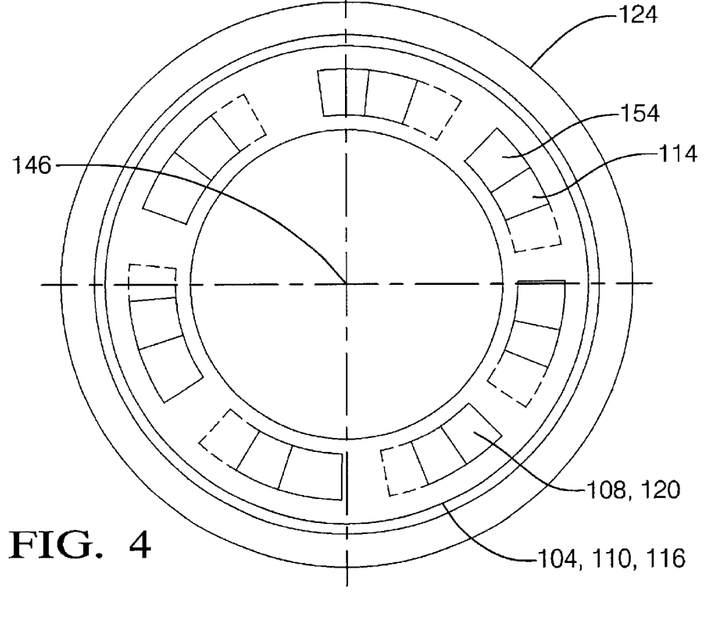
FIG. 4 is a sectional view of the assembly of the adjustable automotive air bag gas venting device of FIG. 1 showing the rotatable ring partially rotated with respect to the retainer plate and the base plate.

In FIG. 4 a sectional view of the assembly of the adjustable automotive air bag gas venting device 100 of FIG. 1 is shown. FIG. 4 shows the rotatable ring 110 partially rotated with respect to the retainer plate 104 and the base plate 116, thus creating a partial opening 154 to allow the passage of the vented inflation gases 150.

Figure 5:
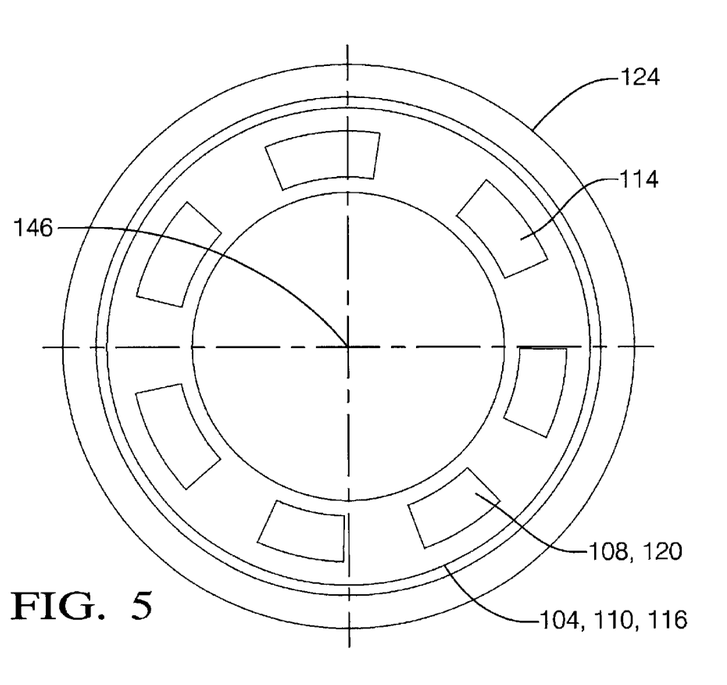
FIG. 5 is a sectional view of the assembly of the adjustable automotive air bag gas venting device of FIG. 1 showing the rotatable ring unrotated with respect to the retainer plate and the base plate.

In FIG. 5 a sectional view of the assembly of the adjustable automotive air bag gas venting device 100 of FIG. 1 is shown. FIG. 5 shows the rotatable ring 110 unrotated with respect to the retainer plate 104 and the base plate 116, thus blocking the passage of the inflation gases 150.

As seen in FIGS. 4 and 5 the rotation of the rotatable ring 110 can be such as to afford venting of the inflation gas 150 in a manner scaled from zero venting (e.g., no rotation of the rotatable ring 110, or no overlap of the vent slots 108, 114, 120) continuously or discretely to venting a prescribed portion of the inflation gas 150 (e.g., full rotation of the rotatable ring 110 or complete overlap of the vent slots 108, 114, 120).

As seen in FIG. 1, the base plate 116 or the retainer plate 104 (or both) includes a recessed chamber 130, 132 aligned with one another for receiving the rotatable ring 110. Also, the base plate 116 or the retainer plate 104 (or both) includes a receptacle 148, 156 aligned with one another for receiving the actuator 122. Thus, the actuator 122 and the rotatable ring 110 are housed within the retainer plate 104 and the base plate 116 whereby the actuator 122, the rotatable ring 110, the retainer plate 104 and the base plate 116 are an integrated unit. The rotatable ring 110 is made of a corrosion resistant material including but not limited to a self lubricating plastic such as nylon or polypropylene for friction free movement.

Figure 6:
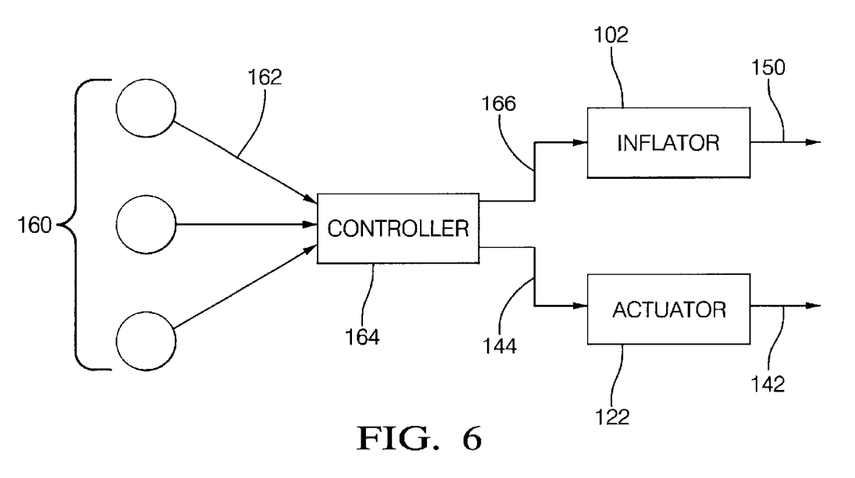
FIG. 6 is a schematic representation of a sensor array and controller in communication with the adjustable automotive air bag gas venting device of FIG. 1.

Referring to FIG. 6, a schematic diagram of a sensor array 160 in signal communication with a controller 164 is shown. The sensor array 160 includes a set of sensors for detecting, for example, deceleration of the automobile, whether a seat belt is buckled, the position of a driver seat or the weight of the driver. The sensors 160 provide a set of signals 162 indicative, for example, of deceleration of the automobile, whether a seat belt is buckled, the position of a driver seat or the weight of the driver to a controller 164. The controller 164 includes control logic and accepts sensor signals 162 as input thereto and provides as output a set of command signals 144, 166. Command signal 144 is provided to the pyrotechnic actuator 122 to initiate the pyrotechnic actuator 122 thereby rotating the rotatable ring 110 so as to at least partially align the third set of vent slots 114 with the first and second set of vent slots 108, 120. Command signal 166 is provided to the inflator 102 to initiate the inflation, or deployment, of the inflatable cushion 152. As best understood from FIG. 6, the relative timing of the initiation of the pyrotechnic actuator 122, in response to signal 144, and the deployment of the inflatable cushion 152, in response to signal 166, is such that the initiation of the pyrotechnic actuator 122 (and the subsequent rotation of the rotatable ring 110) may be accomplished either before, during or after the deployment of the inflatable cushion 152.

Figure 9:
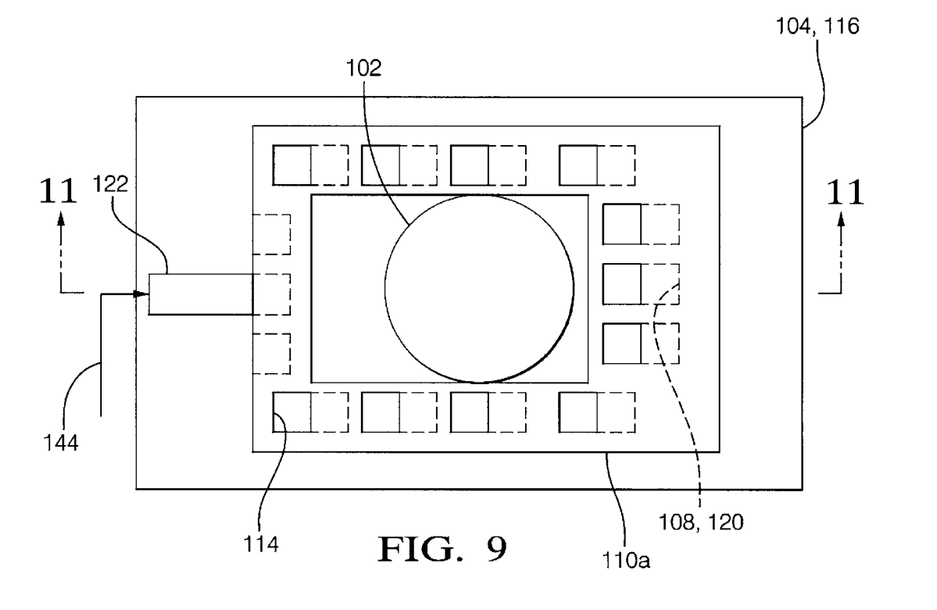
FIG. 9 is a sectional view of the assembly of the adjustable automotive air bag gas venting device showing a rectilinearly slidable plate.
Figure 10:
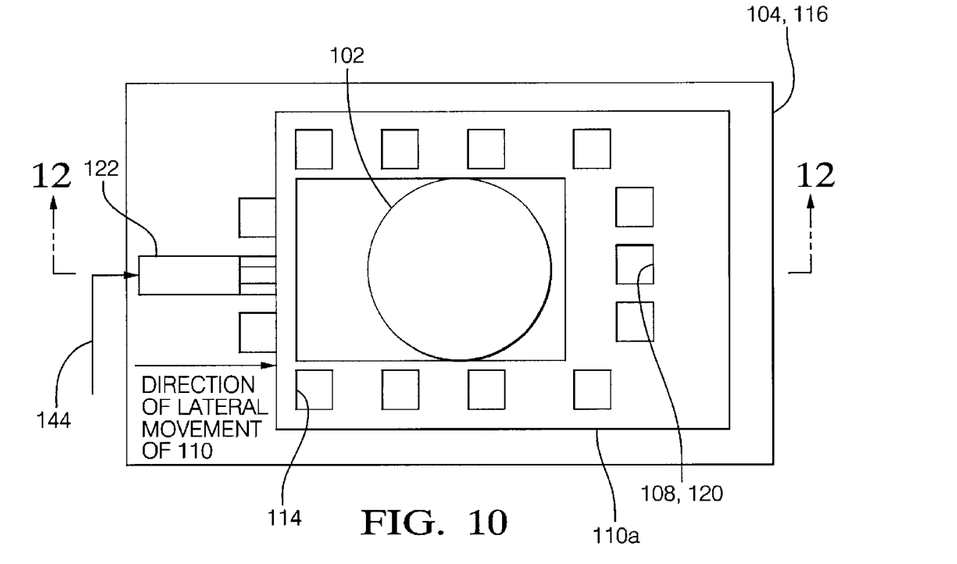
FIG. 10 is a sectional view of the assembly of the adjustable automotive air bag gas venting device showing the rectilinearly slidable positioned by an actuator to effect venting of the air bag.
Figure 11:
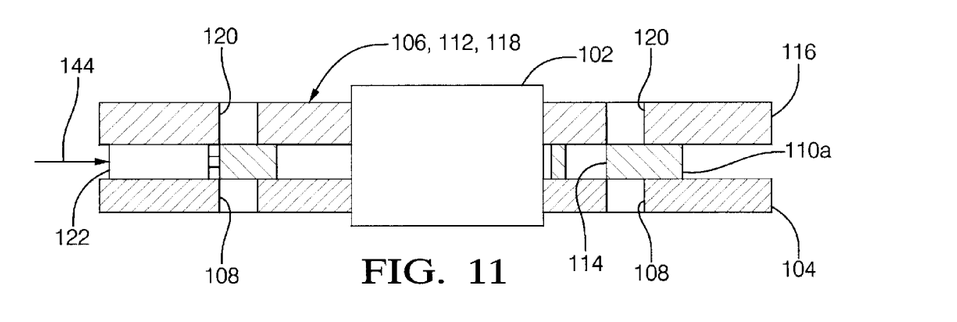
FIG. 11 is a sectional view of the assembly of the adjustable automotive air bag gas venting device of FIG. 9.
Figure 12:
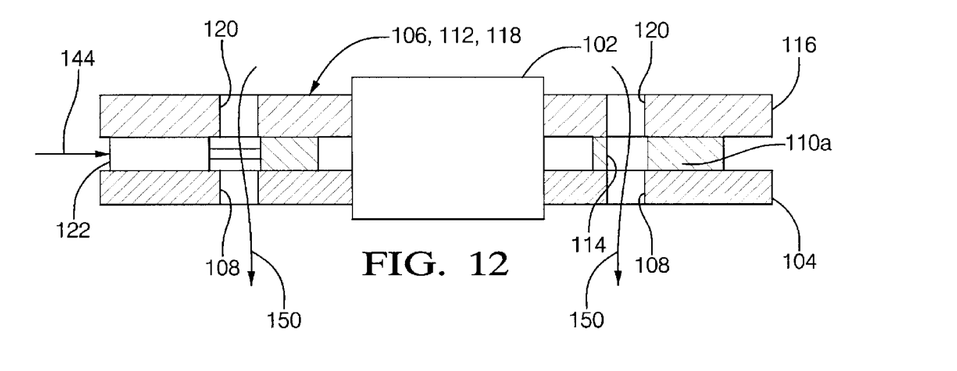
FIG. 12 is a sectional view of the assembly of the adjustable automotive air bag gas venting device of FIG. 10.

Reference is now made to FIGS. 9, 10, 11 and 12. In FIGS. 9 and 11, the rotatable ring 110 is replaced with a linearly slidable plate 110a in intimate contact with the actuator 122 before an activation event. In this configuration the third set of vent slots 114 of the slidable plate 110a are displaced from the first and second set of vent slots 108, 120 of the retainer plate 104 and the base plate 116, thus allowing no venting path for the inflation gas 150. In FIGS. 10 and 12, in response to the initiation of the actuator 122, the slidable plate 110a moves laterally so as to align the third set of vent slots 114 with the first and second set of vent slots 108, 120, thereby providing for a venting path for the inflation gas 150.

In FIGS. 9, 10, 11 and 12 the lateral movement of the slidable plate 110a can be such as to afford venting of the inflation gas 150 in a manner scaled from zero venting (e.g., no lateral movement of the slidable plate 110a, or no overlap of the vent slots 108, 114, 120) continuously or discretely to venting a prescribed portion of the inflation gas 150 (e.g., full lateral movement of the slidable plate 110a or complete overlap of the vent slots 108, 114, 120).

The slidable late 110a is made of a corrosion resistant material such as a self lubricating plastic such as nylon or polypropylene for friction free movement.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein by reference are not to be construed as limiting to the claims.

What is claimed is:

1. A dynamically adjustable automotive air bag gas venting system comprising:
   an inflatable cushion stored in a non-inflated configuration;
   an inflator receptive of a first command signal for initiating the inflator;
   wherein the inflator is in fluid communication with the inflatable cushion and operative in response to the first command signal to generate a prescribed quantity of inflation gas so as to deploy the inflatable cushion to an inflated configuration;
   a retainer plate including:
      a first aperture receptive of the inflator; and
      a first set of vent slots peripheral to the first aperture;
   a base plate including:
      a second aperture aligned with the first aperture and receptive of the inflator;
      and a second set of vent slots aligned with the first set of vent slots and peripheral to the second aperture;
      a rotatable ring positioned between the base plate and the retainer plate and including:
         a third aperture aligned with the first and second apertures and receptive of the inflator; and
         a third set of vent slots peripheral to the third aperture; and
         a pyrotechnic actuator receptive of a second command signal for initiating the pyrotechnic actuator;
         wherein the pyrotechnic actuator is positioned proximate to the rotatable ring and operative in response to the second command signal to rotate the rotatable ring so as to at least partially align the third set of vent slots with the first and second set of vent slots.

2. The gas venting system as set forth in claim 1 further comprising a retaining ring for securing the inflatable cushion, the retainer plate, the base plate, the rotatable ring and the actuator to the inflator.

3. The gas venting system as set forth in claim 1 wherein the rotatable ring is rotated so as to at least partially align the third set of vent slots with the first and second set of vent slots during deployment of the inflatable cushion to the inflated configuration.

4. The gas venting system as set forth in claim 1 wherein the rotatable ring is rotated so as to at least partially align the third set of vent slots with the first and second set of vent slots prior to deployment of the inflatable cushion to the inflated configuration.

5. The gas venting system as set forth in claim 1 wherein the rotatable ring is rotated so as to at least partially align the third set of vent slots with the first and second set of vent slots after deployment of the inflatable cushion to the inflated configuration.

6. The gas venting system as set forth in claim 1 further comprising:
   an array of sensors for detecting a set of dynamical properties of an automobile, generating thereby a set of sensor signals indicative of the dynamical properties; and
   a controller receptive of the sensor signals and operative thereby to generate the first and second command signals.

7. The gas venting system as set forth in claim 6 wherein the array of sensors include at least one of a seat position sensor, an optical scanner, a load sensor, a seat recline sensor, and a seat belt use detection sensor.

8. The gas venting system as set forth in claim 1 wherein the rotatable ring comprises a self lubricating plastic.

9. A method of dynamically adjusting venting of a portion of inflation gas from an automotive air bag gas venting system including an inflator for generating a prescribed quantity of inflation gas so as to deploy an inflatable cushion to an inflated configuration and a pyrotechnic actuator for rotating a rotatable ring so as to at least partially vent a portion of the inflation gas, the method comprising:
   detecting a set of dynamical properties of an automobile including at least one of automotive seat position, automotive seat load, automotive seat configuration, automotive seat belt use and an air bag activation event;
   responsive to the detected set of dynamical properties of an automobile, generating a set of sensor signals indicative of the dynamical properties;
   responsive to the sensor signals, generating a set of command signals including:
      a first command signal initiating the inflator thereby deploying the inflatable cushion; and
      a second command signal initiating the pyrotechnic actuator;
   wherein the pyrotechnic actuator is initiated at any time before, during or after deployment of the inflatable cushion.

10. A dynamically adjustable automotive air bag gas venting system comprising:
   an inflatable cushion stored in a non-inflated configuration;
   an inflator receptive of a first command signal for initiating the inflator;
   wherein the inflator is in fluid communication with the inflatable cushion and operative in response to the first command signal to generate a prescribed quantity of inflation gas so as to deploy the inflatable cushion to an inflated configuration;
   the inflator including:
      a flange peripheral to the inflator;
      a first recessed portion in the flange; and
      a first set of vent slots;
   a base plate including:
      a first aperture receptive of the inflator;
      and a second set of vent slots aligned with the first set of vent slots and peripheral to the first aperture;
   a rotatable ring positioned within the first recessed portion between the base plate and the flange and including:
      a second aperture aligned with the first aperture and receptive of the inflator; and
      a third set of vent slots peripheral to the second aperture;
   a pyrotechnic actuator receptive of the command signal for initiating the pyrotechnic actuator;
   wherein the pyrotechnic actuator is positioned proximate to the rotatable ring and operative in response to the command signal to rotate the rotatable ring so as to at least partially align the third set of vent slots with the first and second set of vent slots.

11. The gas venting system as set forth in claim 10 further comprising a retaining ring for securing the inflatable cushion, the base plate, the rotatable ring and the actuator to the flange.

12. The gas venting system as set forth in claim 10 wherein the rotatable ring is rotated so as to at least partially align the third set of vent slots with the first and second set of vent slots during deployment of the inflatable cushion to the inflated configuration.

13. The gas venting system as set forth in claim 10 wherein the rotatable ring is rotated so as to at least partially align the third set of vent slots with the first and second set of vent slots prior to deployment of the inflatable cushion to the inflated configuration.

14. The gas venting system as set forth in claim 10 wherein the rotatable ring is rotated so as to at least partially align the third set of vent slots with the first and second set of vent slots after deployment of the inflatable cushion to the inflated configuration.

15. The gas venting system as set forth in claim 10 further comprising:
   an array of sensors for detecting a set of dynamical properties of an automobile, generating thereby a set of sensor signals indicative of the dynamical properties; and
   a controller receptive of the sensor signals and operative thereby to generate the first and second command signals.

16. The gas venting system as set forth in claim 15 wherein the array of sensors include at least one of a seat position sensor, an optical scanner, a load sensor, a seat recline sensor, and a seat belt use detection sensor.

17. The gas venting system as set forth in claim 10 wherein the rotatable ring comprises a self lubricating plastic.

18. A dynamically adjustable automotive air bag gas venting system comprising:
   an inflatable cushion stored in a non-inflated configuration;
   an inflator receptive of a first command signal for initiating the inflator;
   wherein the inflator is in fluid communication with the inflatable cushion and operative in response to the first command signal to generate a prescribed quantity of inflation gas so as to deploy the inflatable cushion to an inflated configuration;
   a retainer plate including:
      a first aperture receptive of the inflator; and a first set of vent slots peripheral to the first aperture;
a base plate including:
  a second aperture aligned with the first aperture and receptive of the inflator;
  and a second set of vent slots aligned with the first set of vent slots and peripheral to the second aperture;
  a rectilinearly slidable plate positioned between the base plate and the retainer plate and including:
    a third aperture aligned with the first and second apertures and receptive of the inflator; and
    a third set of vent slots peripheral to the third aperture; and
  a pyrotechnic actuator receptive of a second command signal for initiating the pyrotechnic actuator;
    wherein the pyrotechnic actuator is positioned proximate to the slidable plate and operative in response to the second command signal to translate the slidable plate rectilinearly so as to at least partially align the third set of vent slots with the first and second set of vent slots.

19. The gas venting system as set forth in claim 18 further comprising a retaining ring for securing the inflatable cushion, the retainer plate, the base plate, the rectilinearly slidable plate and the actuator to the inflator.

20. The gas venting system as set forth in claim 18 wherein the rectilinearly slidable plate is translated so as to at least partially align the third set of vent slots with the first and second set of vent slots during deployment of the inflatable cushion to the inflated configuration.

21. The gas venting system as set forth in claim 18 wherein the rectilinearly slidable plate is translated so as to at least partially align the third set of vent slots with the first and second set of vent slots prior to deployment of the inflatable cushion to the inflated configuration.

22. The gas venting system as set forth in claim 18 wherein the rectilinearly slidable plate is translated so as to at least partially align the third set of vent slots with the first and second set of vent slots after deployment of the inflatable cushion to the inflated configuration.

23. The gas venting system as set forth in claim 18 further comprising:
  an array of sensors for detecting a set of dynamical properties of an automobile, generating thereby a set of sensor signals indicative of the dynamical properties; and
  a controller receptive of the sensor signals and operative thereby to generate the first and second command signals.

24. The gas venting system as set forth in claim 23 wherein the array of sensors include at least one of a seat position sensor, an optical scanner, a load sensor, a seat recline sensor, and a seat belt use detection sensor.

25. The gas venting system as set forth in claim 18 wherein the rectilinearly slidable plate comprises a self lubricating plastic.

26. The gas venting system as set forth in claim 1 wherein the base plate or the retainer plate includes a recessed chamber receptive of the rotatable ring.

27. The gas venting system as set forth in claim 1 wherein the base plate or the retainer plate includes a receptacle receptive of the actuator.

28. The gas venting system as set forth in claim 10 wherein the base plate or the retainer plate includes a recessed chamber receptive of the rotatable ring.

29. The gas venting system as set forth in claim 10 wherein the base plate or the retainer plate includes a receptacle receptive of the actuator.

30. A dynamically adjustable automotive air bag gas venting system comprising:
  an inflatable cushion stored in a non-inflated configuration;
  an inflator receptive of a first command signal for initiating the inflator;
  wherein the inflator is in fluid communication with the inflatable cushion and operative in response to the first command signal to generate a prescribed quantity of inflation gas so as to deploy the inflatable cushion to an inflated configuration;
  the inflator including:
    a flange peripheral to the inflator; and
    a first set of vent slots;
    a base plate including:
      a first aperture receptive of the inflator;
      a first recessed portion in the base plate; and
      a second set of vent slots aligned with the first set of vent slots and peripheral to the first aperture;
    a rotatable ring positioned within the first recessed portion between the base plate and the flange and including:
      a second aperture aligned with the first aperture and receptive of the inflator; and
      a third set of vent slots peripheral to the second aperture;
    a pyrotechnic actuator receptive of the command signal for initiating the pyrotechnic actuator;
      wherein the pyrotechnic actuator is positioned proximate to the rotatable ring and operative in response to the command signal to rotate the rotatable ring so as to at least partially align the third set of vent slots with the first and second set of vent slots.

31. The gas venting system as set forth in claim 30 further comprising a retaining ring for securing the inflatable cushion, the base plate, the rotatable ring and the actuator to the flange.

32. The gas venting system as set forth in claim 30 wherein the rotatable ring is rotated so as to at least partially align the third set of vent slots with the first and second set of vent slots during deployment of the inflatable cushion to the inflated configuration.

33. The gas venting system as set forth in claim 30 wherein the rotatable ring is rotated so as to at least partially align the third set of vent slots with the first and second set of vent slots prior to deployment of the inflatable cushion to the inflated configuration.

34. The gas venting system as set forth in claim 30 wherein the rotatable ring is rotated so as to at least partially align the third set of vent slots with the first and second set of vent slots after deployment of the inflatable cushion to the inflated configuration.

35. The gas venting system as set forth in claim 30 further comprising:
  an array of sensors for detecting a set of dynamical properties of an automobile, generating thereby a set of sensor signals indicative of the dynamical properties; and
  a controller receptive of the sensor signals and operative thereby to generate the first and second command signals.

36. The gas venting system as set forth in claim 35 wherein the array of sensors include at least one of a seat position sensor, an optical scanner, a load sensor, a seat recline sensor, and a seat belt use detection sensor.

37. The gas venting system as set forth in claim 30 wherein the rotatable ring comprises a self lubricating plastic.

* * * * *